C. W. ROGERS, DEC'D.
A. V. ROGERS, ADMINISTRATRIX.
BEET HARVESTING MACHINE.
APPLICATION FILED MAR. 20, 1918.
1,307,640.
Patented June 24, 1919.
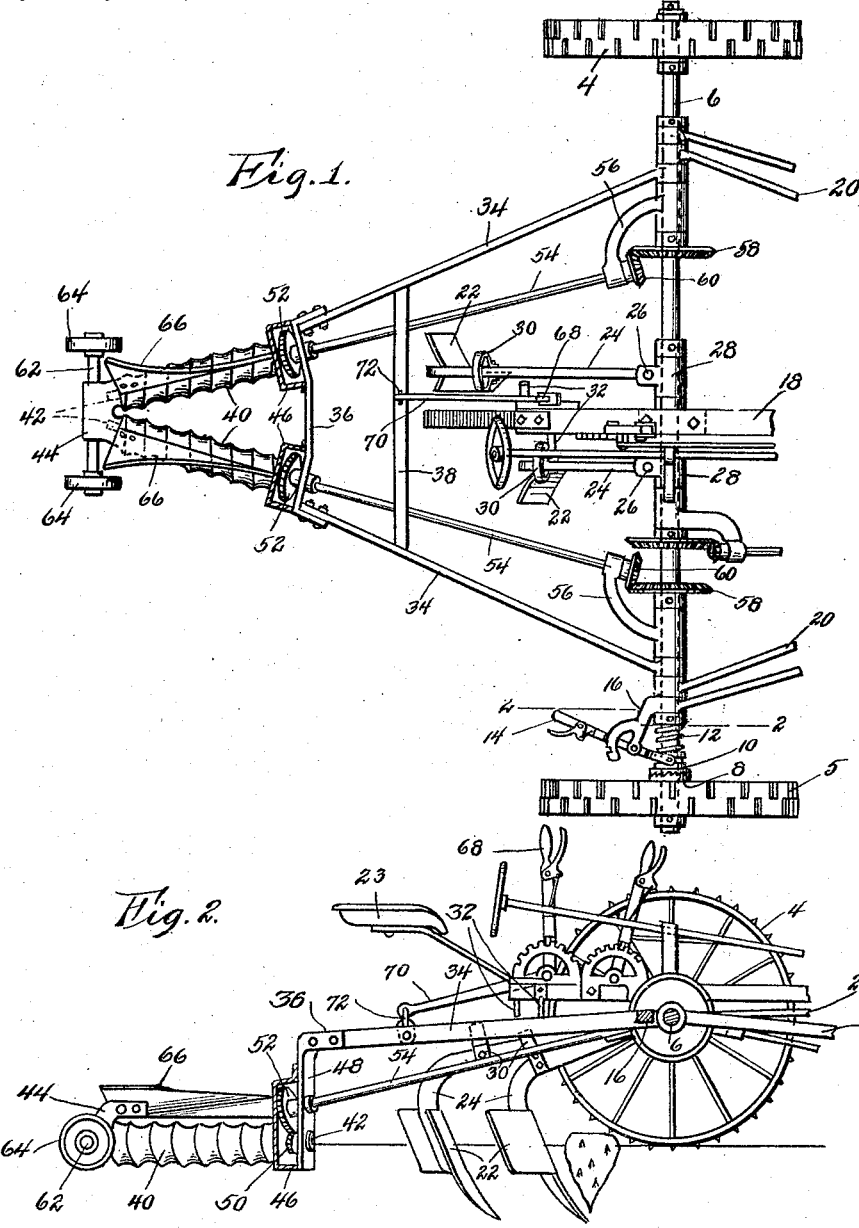
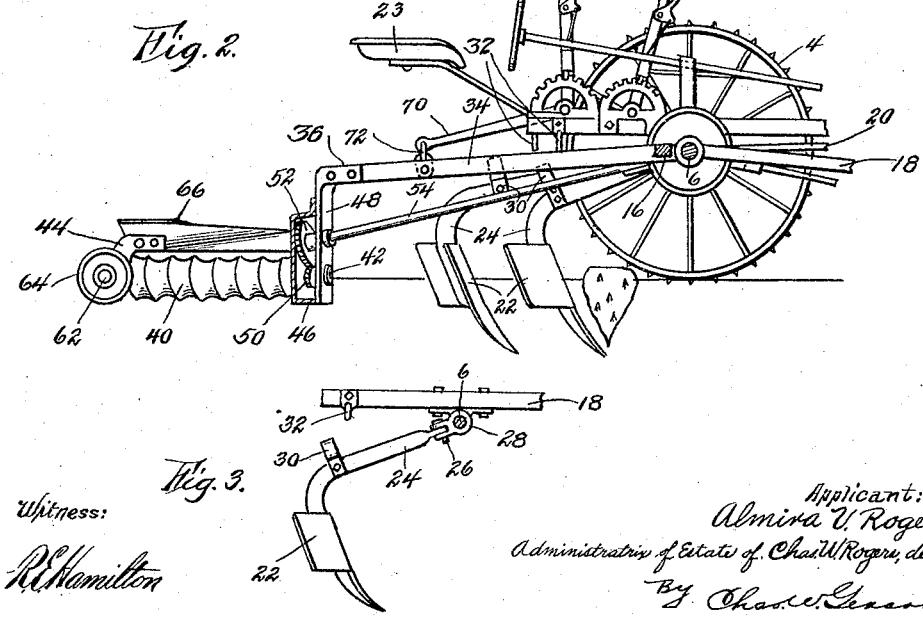
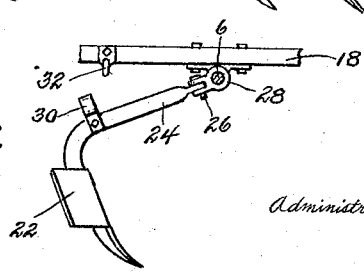

UNITED STATES PATENT OFFICE.

CHARLES W. ROGERS, DECEASED, BY ALMIRA V. ROGERS, ADMINISTRATRIX, OF MARION, INDIANA.

BEET-HARVESTING MACHINE.

1,307,640.  Specification of Letters Patent.  Patented June 24, 1919.

Original application filed January 26, 1917, Serial No. 144,575. Divided and this application filed March 20, 1918. Serial No. 223,645.

*To all whom it may concern:*

Be it known that CHARLES W. ROGERS, late a citizen of the United States, deceased, did invent a certain new and useful Improvement in Beet-Harvesting Machines, of which the following is a full and exact specification.

The present invention relates to beet harvesting machinery, and one of the objects in view is to provide an improved construction and arrangement of beet uprooting mechanism comprising means of furrowing and loosening the soil at the sides of the beets, followed by beet engaging means traversing the furrows produced by said furrowing means and acting to lift the beets from the soil and deposit them upon the surface.

It is also sought to devise a furrowing means adapted to be maintained constantly under the ready and convenient control of the driver so as to vary the paths of the furrow producing members in accordance with any irregularity in the line or row of beets. Means are also provided for supporting the furrowing means in inoperative position, as well as means for effecting appropriate adjustment of the beet engaging and lifting mechanism according to the working conditions, and for shifting the same either into or out of operative position.

It is further sought to devise a simple and efficient construction of as few parts as possible for accomplishing the desired results. Various minor objects will appear in the course of the detailed description.

With these general objects in view the invention will now be described in detail by reference to the accompanying drawing illustrating one form of embodiment of the improvements, after which those features deemed to be novel will be set forth in the appended claim.

In the drawing—

Figure 1 is a plan view of the rear portion of a beet harvesting machine constructed with beet uprooting mechanism embodying the present improvements;

Fig. 2 is a side elevation of the same, partly in section on the line 2—2 of Fig. 1; and Fig. 3 is an enlarged detail elevation showing one of the shovel or furrowing members.

Referring now to the drawing in detail, this illustrates the harvester as comprising main supporting wheels, 4, 5, connected by an axle 6 by which the framework of the machine is carried. Besides its function as a supporting axle, the said axle 6 also serves as a drive shaft for imparting motion to both the cutting or topping mechanism (not shown) and to the beet engaging and lifting mechanism hereinafter described, for which purpose one of the supporting wheels, as 5, is provided with a clutch hub 8 for engagement by a movable clutch element 10 which is actuated by a spring 12 into normally clutched relation with said hub 8, a hand lever 14 being provided for throwing the clutch parts out of engagement when desired to disconnect the drive. The lever 14 is mounted in a bracket 16 projecting from the framework of the machine, said framework comprising, in part, the tongue 18 connected with the midpoint of the axle 6, and the side members 20 extending toward the front end of the machine. These details of the construction as well as of the cutting or topping mechanism are shown more fully in Patent No. 1253426, issued January 15, 1918, on application Serial No. 144575 filed January 26, 1917, of which the present application is a division.

The beet uprooting mechanism comprises shovel members for furrowing the ground at the opposite sides of the row of beets, together with beet engaging means adapted to traverse the furrows formed by the said shovel members and lift the beets above the surface. The shovels 22 are of suitable form and size for entering the ground to the proper depth necessary for loosening the soil and producing furrows by throwing the soil away from the opposite sides of the row of beets. The shovels are carried on opposite sides of the driver's seat 23 and at the rear ends of beams 24, one of which beams is longer than the other in order that one of the shovels 22 may be carried in advance of the other, and the front ends of the beams are swiveled about pins 26 (see Fig. 3) for permitting lateral swinging movement of the beams, said pins serving to connect the beams to bearings 28 which are journaled on the axle 6 at opposite sides of the tongue 18. Suitable foot engaging stirrups 30 are provided on the beams 24 for engagement by the driver's feet, whereby the lateral positions of the shovels may be readily controlled and adjusted without other connections. When not in operation, the shovels may be raised sufficiently to engage the beams 24 with the hook members 32 provided on the opposite sides of the tongue 18, thereby supporting the shovel members out of operative position.

Extending to the rear of the axle is also a swinging frame comprising rearwardly converging side members 34 swivelly connected at their front ends to the axle 6 and connected together by the transverse members 36 and 38. Carried by the rear ends of this frame is the beet engaging and lifting mechanism comprising the helically grooved rollers 40 which are mounted with their axes converging rearwardly upon opposite sides of the middle longitudinal line of the machine, corresponding, of course, to the line of the row of beets being harvested as the machine traverses said row. The rear ends of the shafts 42 of said rollers are journaled in a housing 44, and the front ends of said shafts project through separate housings 46 carried by the arms 48 depending from the transverse member 36. Within these housings 46 the said shafts are provided with gears 50 (Fig. 2) in mesh with gears 52 on the rear ends of shafts 54, the opposite or front ends of which are carried in bearing brackets 56 supported on the axle 6, from which said shafts are driven by means of gears 58 fixed to said axle and meshing with gears 60 provided on the front ends of the shafts. The rear housing 44 is provided with an axle 62 on the opposite ends of which are mounted a pair of auxiliary supporting wheels 64, and said housing 44 is further connected to the rear ends of a pair of deflecting guards 66, which extend forwardly over the rollers 40 to the housings 46, the function of these guards 66 (which are curved as illustrated in Figs. 1 and 2) being to guide the beets, as lifted by the rollers 40, rearwardly over the housing 44 for depositing the beets back in the row instead of at the sides thereof. The frame supporting this portion of the beet uprooting mechanism may be swung to position said mechanism into or out of operative position by means of a lever 68 mounted on the tongue beam 18 and connected by the rod 70 and links 72 to the transverse member 38.

After the topping mechanism has operated to cut and remove the tops from the beets, the shovel members 22 act to loosen the soil at the opposite sides of the topped beets, the advance shovel member drawing the soil away from the beets at one side and the rear shovel member thereafter drawing the soil away from the beets at the opposite side, and at the same time the action of the rear shovel also serves to push the beets over in the direction of their unsupported sides from which the soil has been previously drawn away by the first shovel,—thus resulting in a loosening of the beets themselves, which obviously facilitates the operation of the beet engaging and lifting means. The shovel members leave shallow furrows through which are trailed the helically grooved rollers 40, by the opposite turning movement of which the beets are engaged from opposite sides and drawn up out of the soil and then guided rearwardly by the guards 66 back over the housing 44, so that the uprooted beets are one by one deposited back upon the top surface of the row which is being harvested. The driver, by engagement with the foot stirrups 30 can readily and conveniently control the position of the shovel members to follow any variations in the lines of the beet rows, and the depth of the furrows made by the shovel members may likewise be regulated by the driver in the same way. Also by operation of the lever 68 the elevation of the beet engaging and lifting rollers is conveniently regulated according to working conditions and said rollers caused to traverse the furrows made by the shovels 22 at the most effective working level. At all times when the parts are not in use they may be shifted into inoperative position by the means provided, the beet engaging and lifting rollers being raised by said lever 68 and the shovel members being simply raised and held up by placing the beams 24 within the hook members 32.

It will thus be apparent that a simple and efficient arrangement and construction have been devised for carrying out the desired objects of the invention, and while the foregoing shows what is regarded as the preferred form of embodiment of the improvements, the right is reserved to such formal changes or modifications as may fairly fall within the scope of the appended claim.

Having described the invention, what I claim is:

In a beet harvesting machine, beet uprooting mechanism comprising a pair of shovel members arranged to travel at opposite sides of the row of beets being harvested for producing furrows at said opposite sides of the row of beets, and beet engaging and lifting means comprising a pair of helically grooved rollers mounted at the rear of said shovel members and traversing the furrows produced by said shovel members, said rollers being provided with deflecting guard members arranged to deflect the beets, as they are uprooted, over the rear ends of said rollers and along the line of the row of beets being harvested.

In testimony whereof I hereto affix my signature.

ALMIRA V. ROGERS,
*Administratrix of the estate of Charles W. Rogers, deceased.*